(12) United States Patent
Wu et al.

(10) Patent No.: US 6,459,738 B1
(45) Date of Patent: Oct. 1, 2002

(54) METHOD AND APPARATUS FOR BITSTREAM DECODING

(75) Inventors: Qiong Wu, Los Gatos, CA (US); Kwok K. Chau, Los Altos, CA (US); Toshiaki Yoshino, Fremont, CA (US)

(73) Assignee: NJR Corporation, Mountain View, CA (US)

( * ) Notice: Subject to any disclaimer, the term of this patent is extended or adjusted under 35 U.S.C. 154(b) by 0 days.

(21) Appl. No.: 09/494,105

(22) Filed: Jan. 28, 2000

(51) Int. Cl.[7] .................................................. H04N 7/12
(52) U.S. Cl. ............................ 375/240.27; 375/240.25; 375/240.26
(58) Field of Search ..................... 375/240.23, 240.24, 375/240.25, 240.26, 240.27; 341/67; 348/425.1, 425.2; 710/260–264; 712/220, 219, 210, 225, 244; 714/798–799

(56) References Cited

U.S. PATENT DOCUMENTS

| | | | |
|---|---|---|---|
| 5,566,192 A | * 10/1996 | Moon .......................... | 714/798 |
| 5,625,355 A | * 4/1997 | Takeno et al. ................. | 341/67 |
| 5,767,799 A | * 6/1998 | Maertens et al. .............. | 341/67 |
| 5,812,791 A | * 9/1998 | Wasserman et al. ......... | 709/247 |
| 5,818,539 A | * 10/1998 | Naimpally et al. .......... | 348/512 |
| 5,907,374 A | * 5/1999 | Liu .............................. | 348/845 |
| 6,011,868 A | * 1/2000 | van den Branden et al. ..... | 382/233 |
| 6,212,236 B1 | * 4/2001 | Nishida et al. ........ | 375/240.12 |
| 6,330,365 B1 | * 12/2001 | Yasuda et al. .............. | 382/233 |

* cited by examiner

Primary Examiner—Vu Le
(74) Attorney, Agent, or Firm—Perkins Coie LLP

(57) ABSTRACT

A decoder for decoding a compressed incoming interruptible bitstream is disclosed. The decoder includes an input register that is capable of receiving a latch command, and that is further capable of latching stored data in a particular state upon receiving the latch command. The decoder also includes decoding logic, such as variable length decoding logic, or run-length decoding logic, in communication with the input register. Further included in the decoder is an output register in communication with decoding logic, that is also capable of receiving the latch command, and that is further capable of latching stored data in a particular state upon receiving the latch command. Finally, the decoder includes a register controller in communication with both the input register and the output register. The register controller is capable of receiving a halt command from the system and, upon receiving the halt command, the register controller sends the latch command to both the input register and the output register.

20 Claims, 8 Drawing Sheets

METHOD AND APPARATUS FOR BITSTREAM DECODING

FIELD OF INVENTION

The present invention relates to compressed bitstream decoding. More specifically, the present invention relates to methods and apparatuses for the decoding of an interruptible bitstream.

BACKGROUND OF THE INVENTION

Because of the advantages digital video has to offer, in the past few decades analog video technology has evolved into digital video technology. For example, digital video can be stored and distributed cheaper than analogy video because digital video can be stored on randomly accessible media such as magnetic disc drives (hard disks) and optical disc media known as compact (CDs). In addition, once stored on a randomly accessible media, digital video may be interactive, allowing it to be used in games, catalogs, training, education, and other applications.

One of the newest products to be based on digital video technology is the digital video disc, sometimes called "digital versatile disc" or simply "DVD." These discs are the size of an audio CD, yet hold up to 17 billion bytes of data, 26 times the data on an audio CD. Moreover, DVD storage capacity (17 Gbytes) is much higher than CD-ROM (600 Mbytes) and can be delivered at a higher rate than CD-ROM. Therefore, DVD technology represents a tremendous improvement in video and audio quality over traditional systems such as televisions, VCRs and CD-ROM.

DVDs generally contain video data in compressed MPEG format. To decompress the video and audio signals, DVD players use decoding hardware to decode the incoming bitstream. FIG. 1 is a block diagram showing a prior art digital video system 100. The digital video system 100 includes a digital source 102, a digital processor 104, and a digital output 106. The digital source 104 includes DVD drives and other digital source providers, such as an Internet streaming video connection. The digital processor 104 is typically an application specific integrated circuit (ASIC), while the digital output 106 generally includes display devices such as television sets and monitors, and also audio devices such as speakers.

Referring next to prior art FIG. 2, a conventional digital processor 104 is shown. The digital processor 104 includes a decompression engine 200, a controller 202, and DRAM 204. Essentially, the bitstream is decompressed by the decompression engine 200, which utilizes the DRAM 204 and the controller 202 during the decompression process. The decompressed data is then sent to a display controller 206, which displays decompressed images on a display device, such as a television or monitor.

As stated previously, digital processors are generally embodied on ASICs. These ASICs typically map key functional operations such as variable length decoding (VLD), run-length decoding (RLD), Zig Zag Scan, inverse quantization (IQ), and inverse discrete cosine transformation (IDCT) to dedicated hardware. To gain processing speeds, techniques such as pipeline implementation of these modules are used to execute computations with available cycle time.

While an incoming bitstream is consistently supplied, such pipeline mechanisms run efficiently. However, a consistently supplied bitstream is not always possible with newer applications. For example, Internet streaming video cannot always guarantee a constant bitstream, since the connection may end or be interrupted at anytime. In addition, interruptions of the bitstream can occur in conventional DVD readers when, for example, the DVD player is not fast enough to keep pace with the rest of the system.

When the bitstream is interrupted, the conventional decompression engine 200 attempts to handle the problem by using error handling methods. However, using conventional error handling methods produces artifacts, which can be seen by users of the system. Moreover, these artifacts generally promulgate to subsequent pictures, thus making the viewing experience further displeasing for the user.

In view of the foregoing, what is needed are improved methods and apparatuses for decoding an incoming bitstream that can handle a bitstream interruption without causing artifacts. Further, the system should be robust and not add significantly to the manufacturing cost.

SUMMARY OF THE INVENTION

The present invention fills these needs by providing a decoder that halts the decoding process when bitstream data becomes unavailable. In one embodiment, the decoder includes an input register that is capable of receiving a latch command, and that is further capable of latching stored data in a particular state upon receiving the latch command. The decoder also includes decoding logic, such as variable length decoding logic, or run-length decoding logic, in communication with the input register. Further included in the decoder is an output register in communication with decoding logic, that is also capable of receiving the latch command, and that is further capable of latching stored data in a particular state upon receiving the latch command. Finally, the decoder includes a register controller in communication with both the input register and the output register. The register controller is capable of receiving a halt command from the system and, upon receiving the halt command, the register controller sends the latch command to both the input register and the output register.

In another embodiment, a method for decoding an incoming compressed bitstream is provided. The method comprises providing a halt command to a register controller that is in communication with both an input register and an output register. Next, a latch command is provided to both the input register and the output register when the register controller receives the halt command. Finally, data stored in the input register and the output register is latched when these registers receive the latch command, thereby halting operation of decoding logic which is in communication with both registers.

In yet another embodiment, an application specific integrated circuit (ASIC) for decoding an incoming compressed bitstream is disclosed. The ASIC includes a memory controller and an input register that is capable of receiving a latch command, and that is further capable of latching stored data in a particular state upon receiving the latch command. The ASIC also includes decoding logic, such as variable length decoding logic, or run-length decoding logic, in communication with the input register. Further included in the ASIC is an output register in communication with decoding logic, that is also capable of receiving the latch command, and that is further capable of latching stored data in a particular state upon receiving the latch command. Finally, the ASIC includes a register controller in communication with both the input register and the output register. The register controller is capable of receiving a halt command from the system and, upon receiving the halt command, the register controller sends the latch command to both the input register and the output register.

Advantageously, the present invention avoids or reduces artifacts generated in response to interruptions of the incoming bitstream. Unlike conventional decoders, which attempt to continuously decode regardless of whether data is available or unavailable, the present invention avoids artifacts by halting decoding operations when data becomes unavailable to the decoder.

In addition, the present invention allows for greater efficiency in decoding by providing a mechanism that allows for synchronization of memory writes by different decoding modules. By halting decoding and memory write operations when write operation conflicts occur, the present invention avoids the need of large buffers of time, used conventionally to prevent memory write conflicts.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

An invention is described for decoding an incoming bitstream while avoiding artifacts when the bitstream flow is interrupted. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
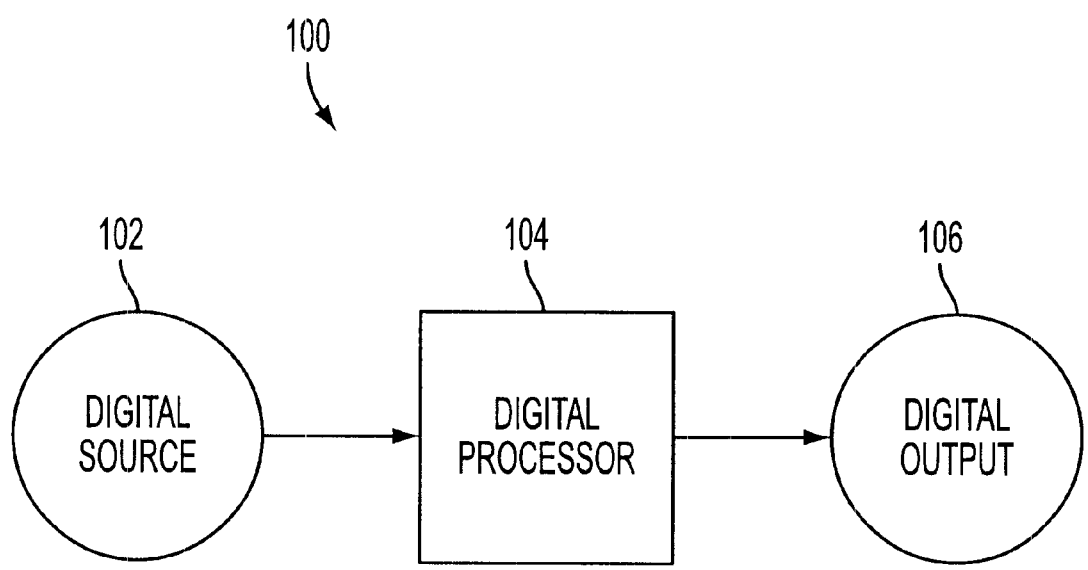
FIG. 1 is a block diagram showing a prior art conventional digital video system.
Figure 2:
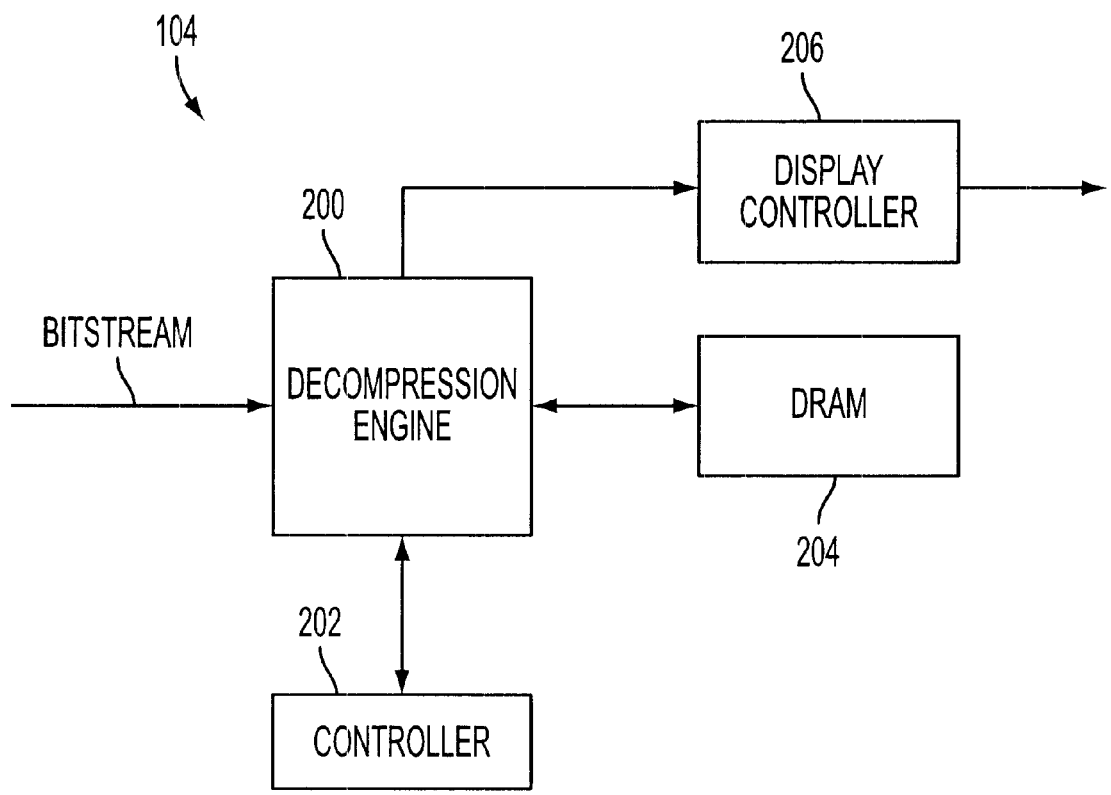
FIG. 2 is block diagram showing a prior art conventional digital processor.
Figure 3:
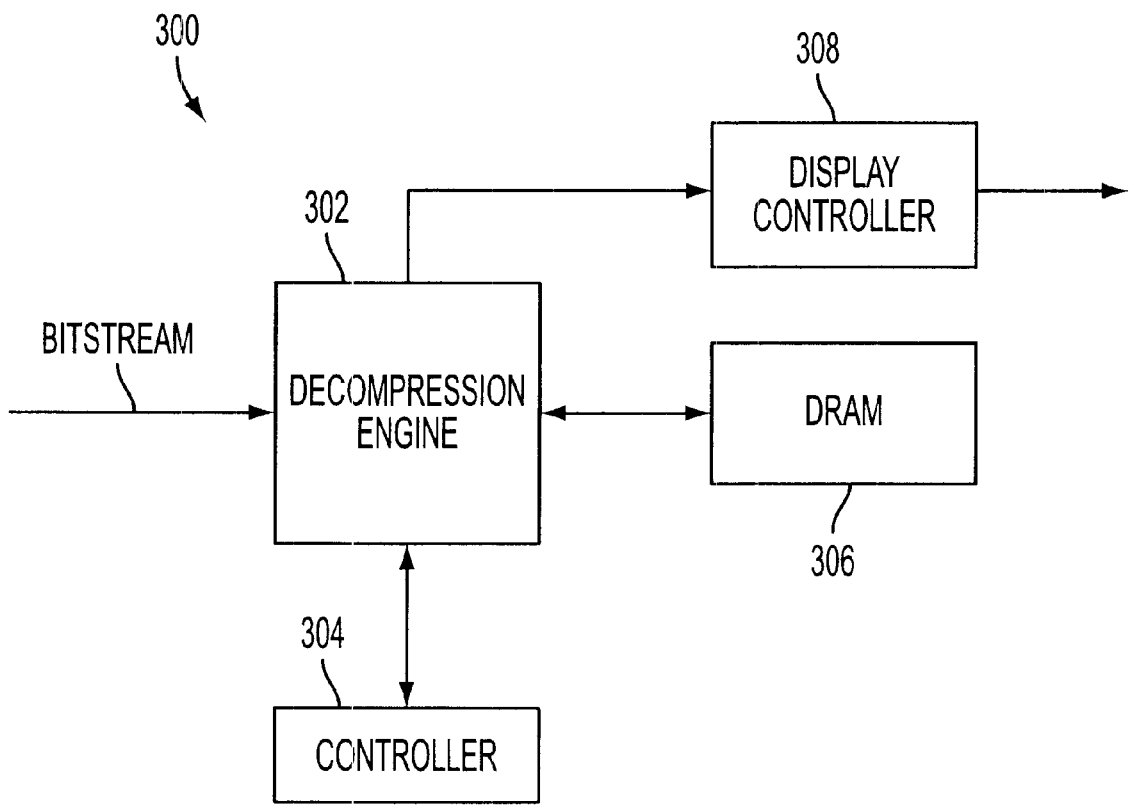
FIG. 3 is a block diagram showing a digital processor in accordance with an embodiment of the present invention.

FIGS. 1 and 2 were described in terms of the prior art. FIG. 3 is a block diagram of a digital processor 300, in accordance with one;embodiment of the present invention. The digital processor 300 includes a decompression engine 302, a controller 304, and DRAM 306. In use, the decompression engine 302 receives an incoming bitstream and then decodes that bitstream utilizing the controller 304 and the DRAM 306. The decompressed data is then sent to a display controller 308, which displays the decompressed image data on a display device, such as a television or computer monitor.

Figure 4:
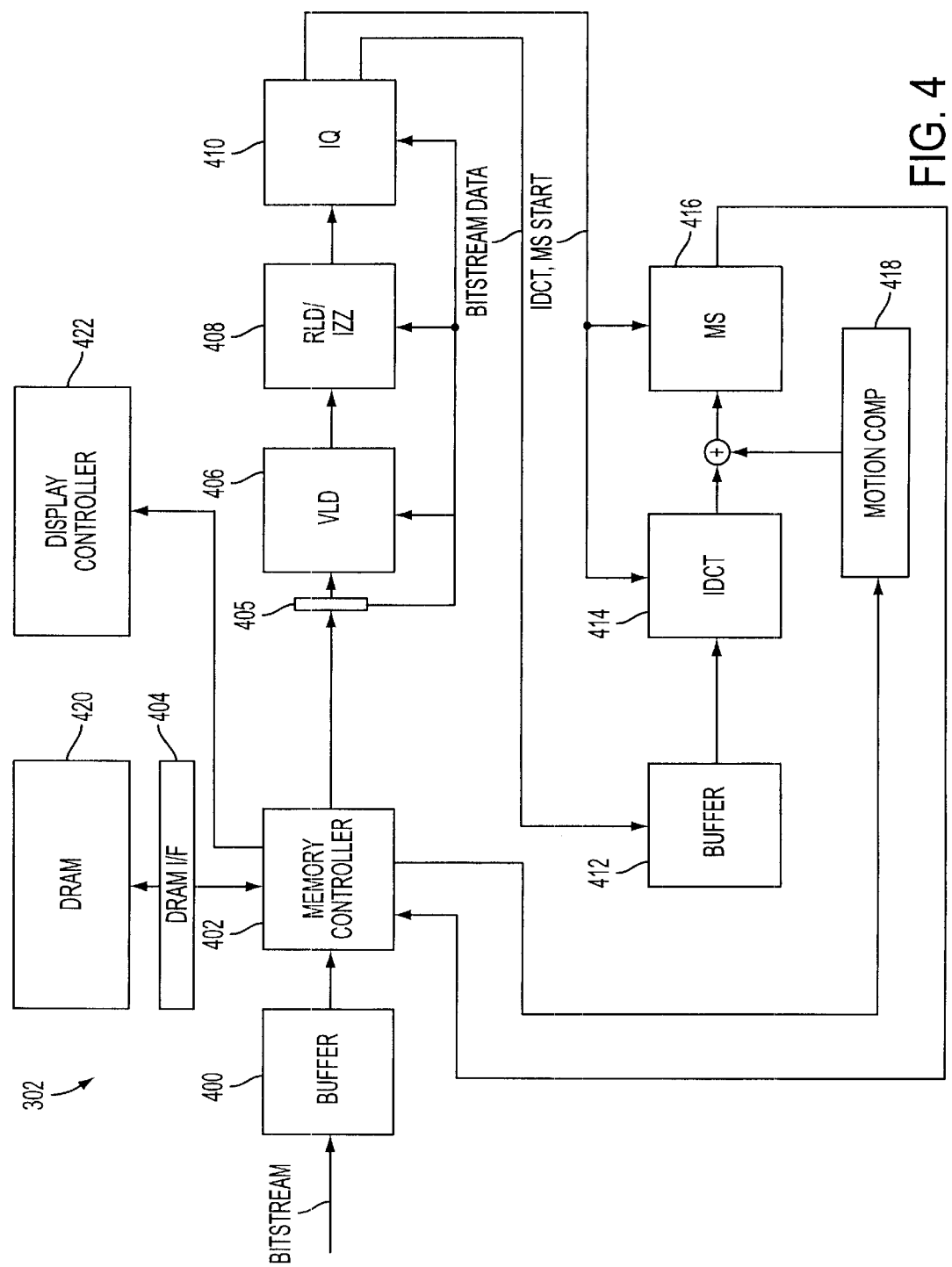
FIG. 4 is block diagram showing a decompression engine in accordance with another embodiment of the present invention.

Referring next to FIG. 4, a decompression engine 302 in accordance with an embodiment of the present invention is shown. The decompression engine 302 includes a memory controller buffer 400, a memory controller 402, a DRAM i/f 404, a FIFO controller 405, a VLD 406, a RLD/IZZ 408, and a IQ 410. In addition, the decompression engine 302 includes an IDCT input double buffer 412, an IDCT 414, a merge and store (MS) 416, and motion compensation 418.

During operation, the bitstream data is received by the memory controller buffer 400. The memory controller 402 then stores the data in DRAM 420 after parsing the data using a parser (not shown). Later, after the data is decoded, the decoded data is again stored in the DRAM 420 by the memory controller 402. Finally, when the data is ready to be viewed, the memory controller 402 obtains the decoded data from the DRAM 420 and sends it to a display controller 422, which displays the decompressed image data on a display device, such as a television or computer monitor.

Generally, an MPEG bitstream is provided to the DRAM i/f 404 by the memory controller 402 and then made available to the VLD 406, RLD/IZZ 408, IQ 410, and IDCT 414 to reconstruct the data. Simultaneously, the motion compensation 418 executes if motion compensation exist for the current data. The VLD 406, RLD/IZZ 408, IQ 410, and IDCT 414 each have a fixed execution time, however, there is a two block latency time from the VLD 406 to the IDCT 414 output memory. When the motion compensation 418 and IDCT 414 finished their operations, the output data from each module is added to together to become the reconstructed data. The MS 416 then stores the reconstructed data in DRAM 420.

The present invention avoids artifact creation by halting the pipeline execution when data is unavailable for decoding. As described in greater detail subsequently, the present invention determines the availability of the bitstream data utilizing the FIFO controller 405. The FIFO controller 405 sends a data valid TRUE signal to the VLD 406, RLD/IZZ 408, and IQ 410 modules when bitstream data is available for decoding. When bitstream data is unavailable for decoding the FIFO controller 405 sends a data valid FALSE signal to the modules. The data valid FALSE signal then makes each module "freeze." Thus, all decoding operations are halted when data becomes unavailable for decoding.

It is important to note that with the IDCT input double buffer 412, the VLD 406, RLD/IZZ 408, IQ 410 alternately write one data block to one buffer of the double buffer 412 when finishing the processing of one block. They then send an IDCT start signal to the IDCT 414. This ensures that the IDCT 414 has a whole data block to process. Thus, the data valid signal from the FIFO controller 405 will not propagate to the IDCT 414. Advantageously, the above described design makes the present invention's implementation relatively simple and cost effective.

Figure 5:
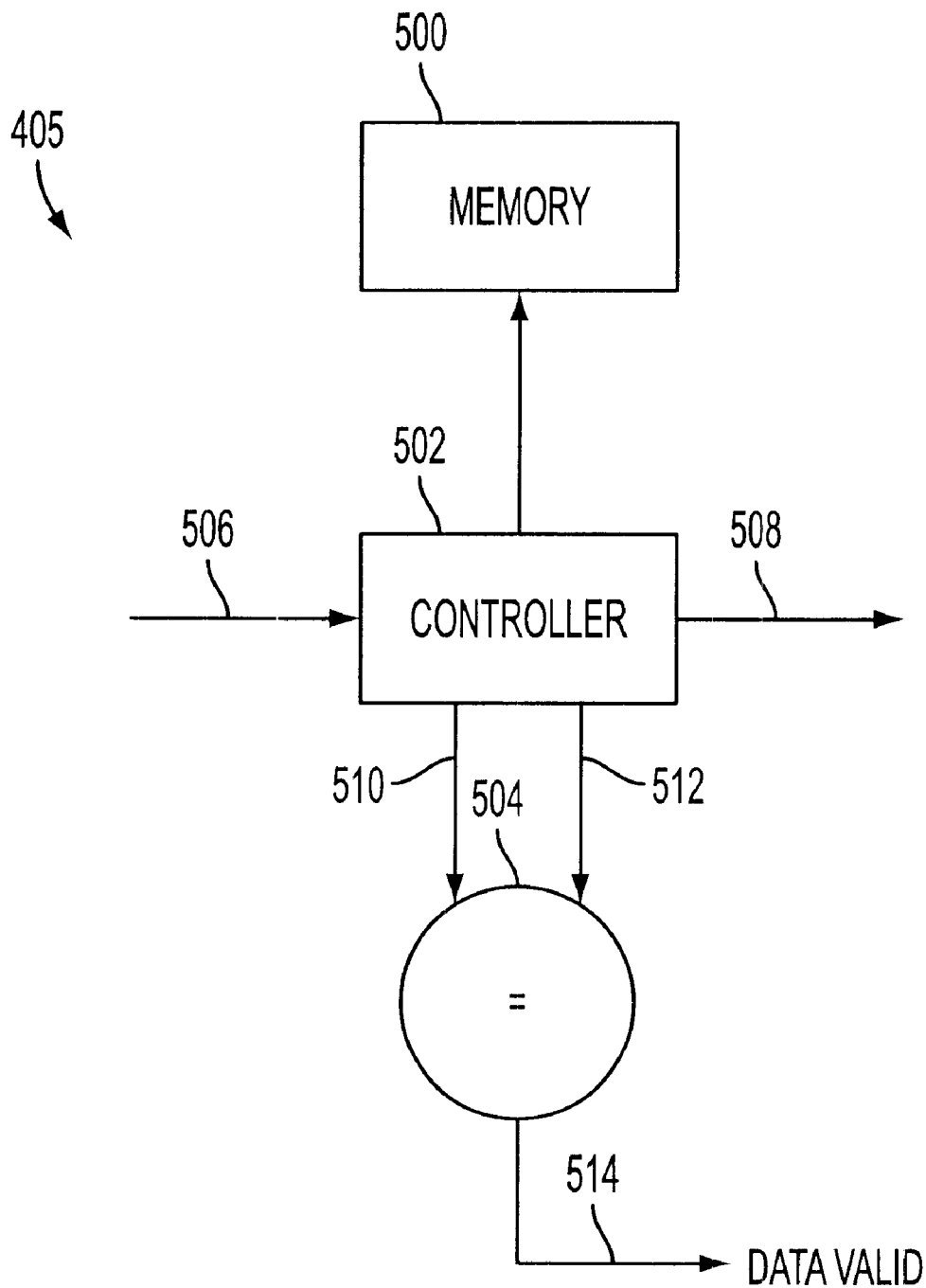
FIG. 5 is a block illustration showing a First In First Out (FIFO) controller in accordance with one aspect of the present invention.

FIG. 5 is a block illustration showing a First In First Out (FIFO) controller 405, in accordance with one aspect of the present invention. The FIFO controller 405 includes memory 500, a controller 502, and a comparator 504. The controller 502 includes an input 506, an output 508, a write pointer 510, and a read pointer 512. Finally, the comparator 504 includes a data valid flag 514.

In use, input data is received by the input 506 of the controller 502. The controller 502 reads and writes the data to memory 500 using the read pointer 512 and the write pointer 510. Data is then output from the controller 502 through the output 508.

An important operation of the FIFO controller 405 is determining whether there exist any data in memory 500 for the decoding system to decode. To determine whether there is data available the controller 502 uses the comparator 504 to compare the write pointer 510 to the read pointer 512. To maintain the data available, write pointer 510 should advance the read pointer 512. In this case, the FIFO controller 405 informs the system that there is available data by setting the data valid flag 514 to TRUE. On the other hand, when the read pointer 512 catches up to the write pointer 510, there is no data available for the decoding system to decode. In this case, the FIFO controller 405 informs the system that there is no data available by setting the data valid flag 514 to FALSE.

Figure 6:
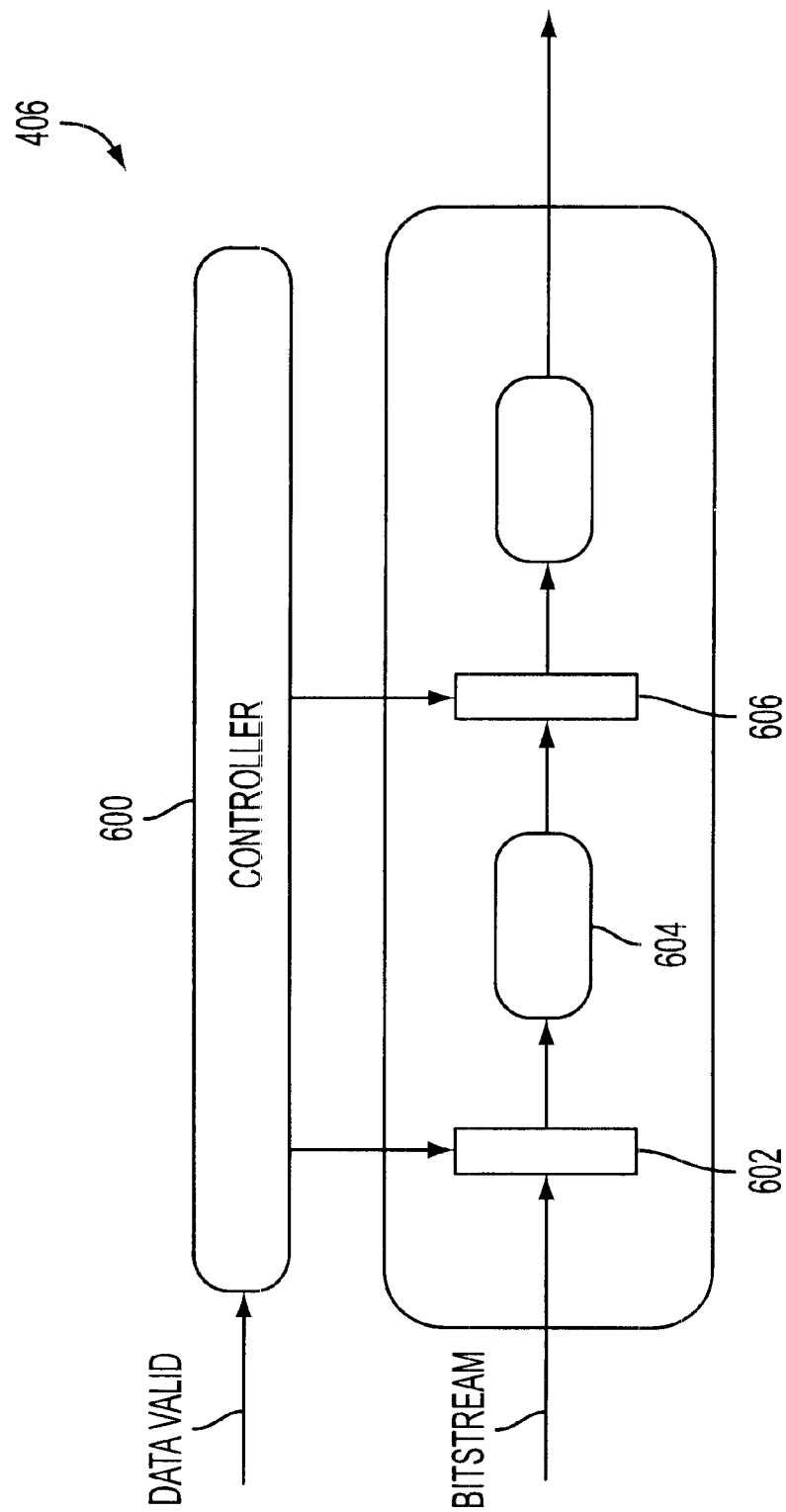
FIG. 6 is a block diagram showing a VLD module in accordance with one aspect of the present invention.

FIG. 6 is a block diagram showing a VLD module 406 in accordance with one aspect of the present invention. VLD module 406 includes a controller 600, an input register 602, VLD logic 604, and an output register 606. The VLD logic 604 includes the computational logic for the VLD module 406. The input register 602 and output register 604 are used to stall execution of the module.

In normal operation bitstream data is input to the VLD logic 604 through the input register 602. The data is then passed on the other modules through the output register 606. Normal operation occurs as long as the controller 600 receives a data valid TRUE signal. However, when the controller 600 receives a data valid FALSE signal, the controller 600 signals the input register 602 and the output register 606 to freeze at their current state. Thus, the actual state of the VLD module 604 remains fixed whenever data valid FALSE signal is sent to the module. These state control mechanisms are also present in the RLD/IZZ and IQ modules.

Thus, referring back to FIG. 4, the VLD 406, RLD/IZZ 408, and IQ 410 all include the state control mechanisms of FIG. 6. Therefore, whenever the FIFO controller 405 determines that bitstream data is unavailable for decoding, the FIFO controller 405 sends a signal to the VLD 406, RLD/IZZ 408, and IQ 410 to remain in their current state.

As stated previously, the data returned from the output of the VLD 406, RLD/IZZ 408, and IQ 410 modules is input to the IDCT input double buffer 412, and then to the IDCT 414. The output from the IDCT is then combined with the output of the motion compensation 418 to form the reconstructed data. The MS 416 then saves the reconstructed data in the DRAM 420.

Figure 7:
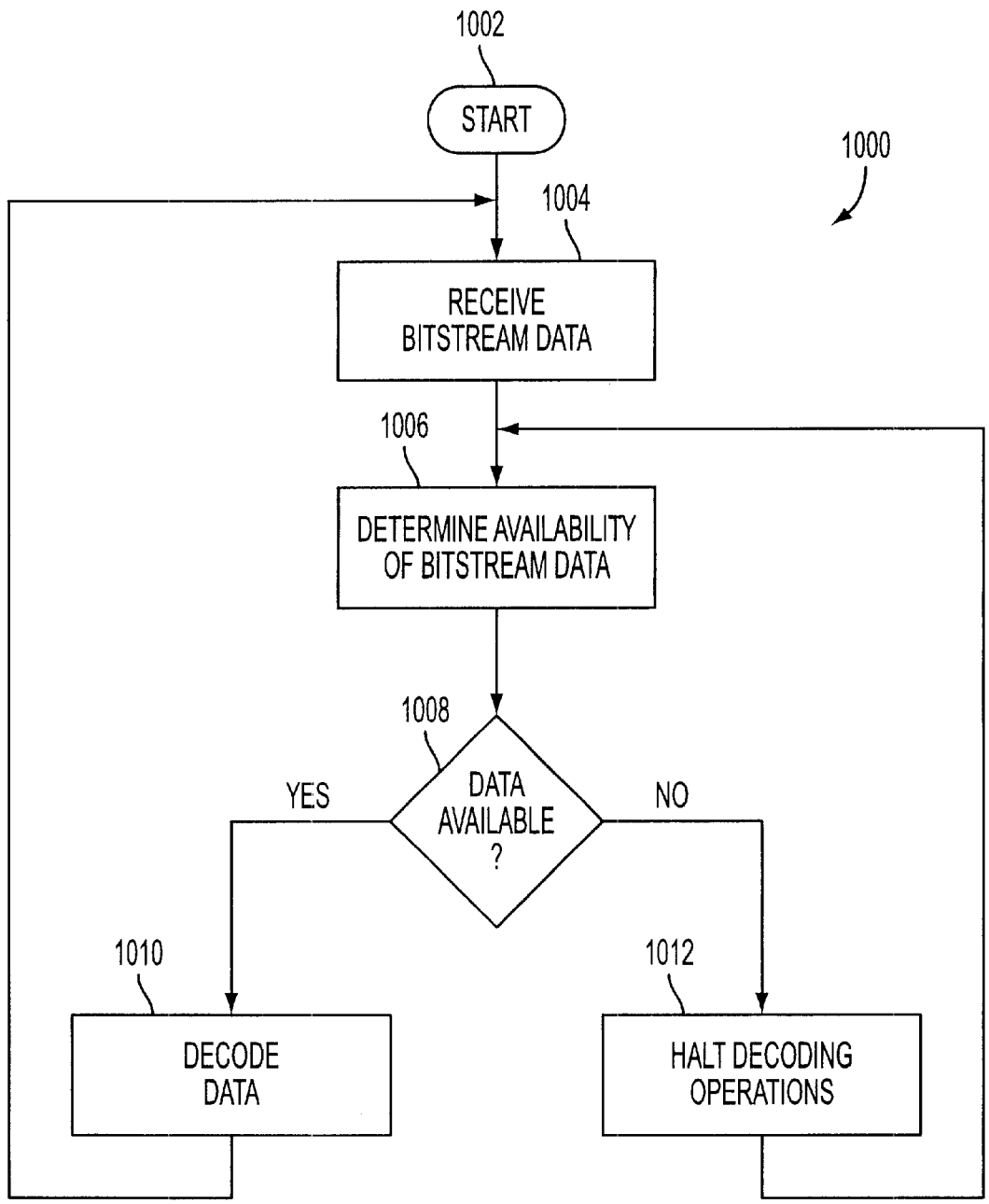
FIG. 7 is a flowchart showing a process for decoding an interruptible bitstream in accordance with an embodiment of the present invention.

Turning next to FIG. 7, a flowchart showing a process 1000 for decoding an interruptible bitstream, in accordance with one embodiment of the present invention. The process starts with an initial operation 1002, wherein pre-process operations are performed. Pre-process operations include temporarily storing the incoming bitstream data into the DRAM and other pre-process operation that will be apparent to those skilled in the art.

In a receive bitstream operation 1004, the system receives compressed bitstream data from the DRAM. In normal operation, the system stores incoming bitstream data into the DRAM. Then, when the system is ready to decode the data, the bitstream data is read from the DRAM and passed onto the FIFO and then to the decoding modules.

Next, in a availability determination operation 1006, the availability of bitstream data in the FIFO is determined. Generally, bitstream data is continuously passed on the decoding modules for decoding. However, this continuous flow of bitstream data may be interrupted, as often occurs with Internet bitstream data or a DRAM access situation when all modules share one DRAM access. Thus, before the system begins decoding operations, it first determines whether there is currently any data available for decoding.

The process then branches in operation 1008. If data is currently available the process continues with a decoding operation 1010. If there is currently no data available for decoding, the process continues with a halting operation 1012.

In a decoding operation 1010, the compressed bitstream data is decoded. This operation generally includes using the VLD, RLD/IZZ, IQ, and IDCT to decode the bitstream data. After decoding the current bitstream data the process continues with another receive bitstream operation 1004.

In halting operation 1012, decoding operations are halted. The present invention avoids artifact creation by halting the pipeline execution when data is unavailable for decoding. As described in greater detail subsequently, the present invention determines the availability of the bitstream data utilizing the FIFO controller. The FIFO controller sends a data valid TRUE signal to the VLD, RLD/IZZ, and IQ modules when bitstream data is available for decoding. When bitstream data is unavailable for decoding the FIFO controller sends a data valid FALSE signal to the modules. The data valid FALSE signal then makes each module "freeze." Thus, all decoding operations are halted when data becomes unavailable for decoding.

Each decoding module includes a controller, an input register, operational logic, and an output register. The operational logic includes the computational logic for the particular module. The input register and output register are used to stall execution of the module.

In normal operation bitstream data is input to the operational logic of the module through the input register. The bitstream is then passed on the other modules through the output register. Normal operation occurs as long as the controller receives a data valid TRUE signal. However, when the controller receives a data valid FALSE signal, the controller signals the input register and the output register to freeze at their current state. Thus, the actual state of each module remains fixed whenever data valid FALSE signal is sent to the module. These state control mechanisms are preferably present in all the decoding modules.

Once decoding operations have been halted, the process continues with another bitstream availability operation 1006. Once the bitstream data is determined to be currently available, the process continues by decoding the bitstream data, in a decoding operation 1010.

Figure 8:
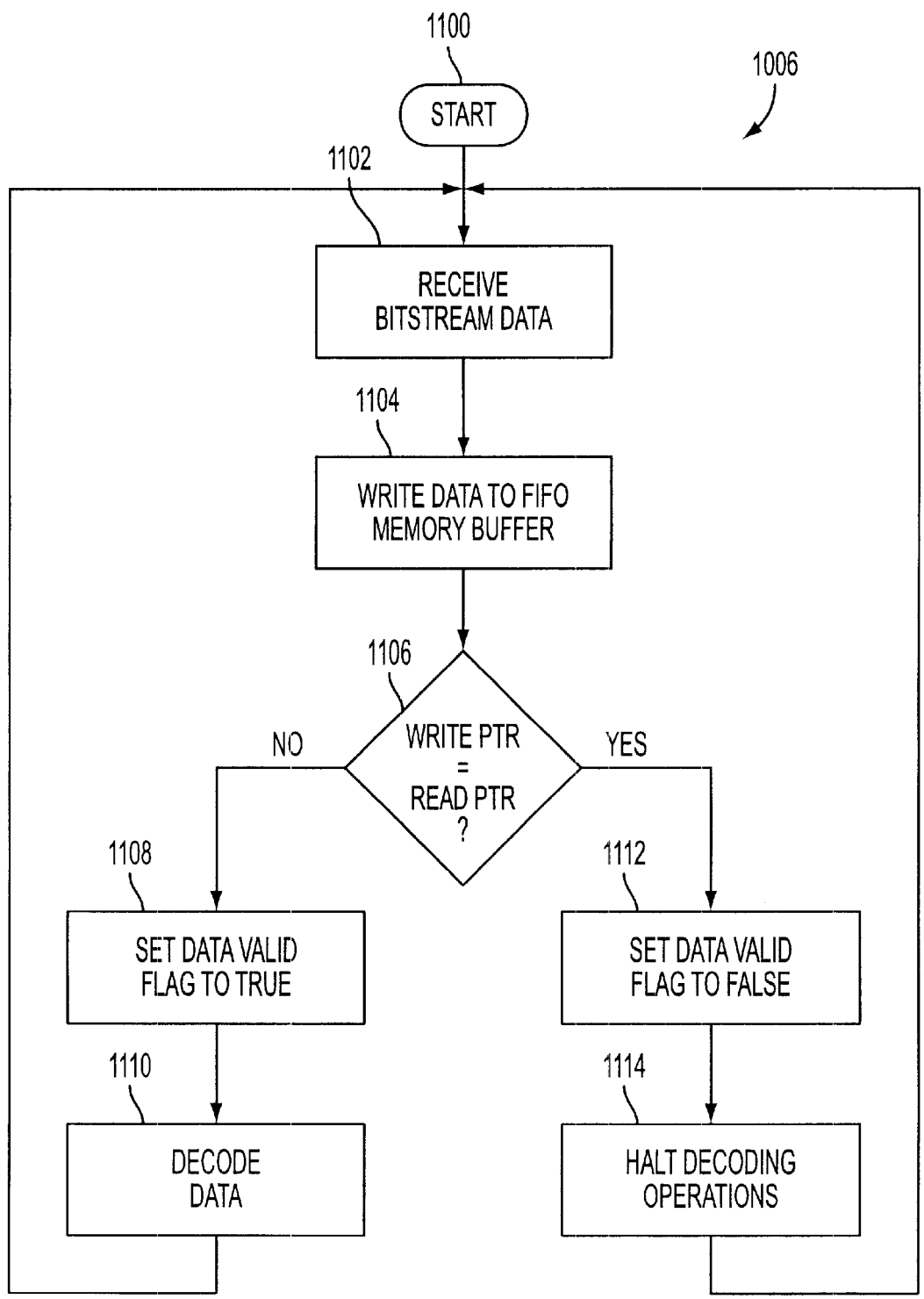
FIG. 8 is a flowchart showing a process for determining the current availability of bitstream data in accordance with one aspect of the present invention.

FIG. 8 is a flowchart showing a process 1006 for determining the current availability of bitstream data, in accordance with one aspect of the present invention. In an initial operation 1100, pre-process operations are performed. Pre-process operations include temporarily storing the incoming bitstream data into the DRAM and other pre-process operation that will be apparent to those skilled in the art.

In a receive bitstream operation 1102, the system receives compressed bitstream data from the DRAM. In normal operation, the system stores incoming bitstream data into the DRAM. Then, when the system is ready to decode the data, the bitstream data is read from the DRAM and passed onto the various decoding modules. This data is then received by a FIFO controller, which aids the system in determining the availability of data.

In a write operation 1104, the FIFO controller writes the incoming bitstream data into a FIFO memory buffer. The FIFO performs its memory write and read operations utilizing memory pointers, which include the address of the data in memory. Generally, a write pointer includes the address of the next available memory location in which data may be stored, and a read pointer includes the address of the next memory address containing data that needs to be read. Since a FIFO controller reads the data in the same order that it was stored, the read pointer will always step through the stored data in the same order as it was stored, without skipping any data block addresses.

Next, in a comparison operation 1106, the read and write pointers are compared with one another. When data is currently stored in the FIFO memory buffer, the write pointer will advance the read pointer. The write point will contain the address of the next available memory location, while the read pointer will contain the address of next data item to be read. On the other hand, if there is currently no data stored in the FIFO memory buffer, the write pointer and the read pointer will contain the same address.

Thus, the system determines whether data is currently available by comparing the write and read pointers during the comparison operation 1106. If the pointers are not equal, there currently exist data to be decoded and the process 1006 continues with a data valid operation 1108. However, if the write and read pointers are equal, there is currently no data available for decoding and the process 1006 continues with a data invalid operation 1112.

When data currently exist to be decoded the data valid flag is set to TRUE, in a data valid operation 1108. As described previously, the data valid flag is utilized by the system to determine whether or not to halt operations of the decoding pipeline. When the data valid flag is set to TRUE decoding operations are continued, as described subsequently.

In a decoding operation 1110, the compressed bitstream data is decoded. This operation generally includes using the VLD, RLD/IZZ, IQ, and IDCT to decode the bitstream data. After decoding the current bitstream data the process continues with another receive bitstream operation 1102.

When data is currently unavailable for decoding the data valid flag is set to FALSE, in a data invalid operation 1112. As described previously, the data valid flag is utilized by the system to determine whether or not to halt operations of the decoding pipeline. When the data valid flag is set to FALSE decoding operations are halted, as described subsequently.

In halting operation 1114, decoding operations are halted, which prevents the read pointer from moving forward, thus the correct data flow is maintained. The present invention avoids artifact creation by halting the pipeline execution when data is unavailable for decoding. As described in greater detail subsequently, the present invention determines the availability of the bitstream data utilizing the FIFO controller. The FIFO controller sends a data valid TRUE signal to the VLD, RLD/IZZ, and IQ modules when bitstream data is available for decoding. When bitstream data is unavailable for decoding the FIFO controller sends a data valid FALSE signal to the modules. The data valid FALSE signal then makes each module "freeze." Thus, all decoding operations are halted when data becomes unavailable for decoding.

Each decoding module includes a controller, an input register, operational logic, and an output register. The operational logic includes the computational logic for the particular module. The input register and output register are used to stall execution of the module.

In normal operation bitstream data is input to the operational logic of the module through the input register. The bitstream is then passed on the other modules through the output register. Normal operation occurs as long as the controller receives a data valid TRUE signal. However, when the controller receives a data valid FALSE signal, the controller signals the input register and the output register to freeze at their current state. Thus, the actual state of each module remains fixed whenever data valid FALSE signal is sent to the module. These state control mechanisms are preferably present in all the decoding modules.

Once decoding operations have been halted, the process continues with another bitstream availability operation 1102. In this manner, the system continues to hold in its present state until receiving a data valid TRUE signal, at which point the current compressed data is decoded.

While the present invention has been described in terms of several preferred embodiments, there are many alterations, permutations, and equivalents which may fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A decoder for decoding an incoming compressed bitstream, the decoder capable of operating on a discontinuous incoming bitstream, the decoder comprising:
    an input register capable of receiving a latch command, the input register further capable of latching stored data in a particular state upon receiving the latch command;
    decoding logic in communication with the input register;
    an output register in communication with the decoding logic, the output register capable of receiving the latch command, the output register further capable of latching stored data in a particular state upon receiving the latch command; and
    a register controller in communication with the input register and the output register, the register controller capable of receiving a halt command, wherein the upon receiving the halt command the register controller sends the latch command to the input register and the output register.

2. A decoder as recited in claim 1, wherein the halt command is received by the register controller when an incoming bitstream is unavailable.

3. A decoder as recited in claim 2, wherein the halt command is generated by a First-In-First-Out (FIFO) controller.

4. A decoder as recited in claim 3, wherein the FIFO controller includes a write pointer and a read pointer.

5. A decoder as recited in claim 4, wherein the FIFO controller generates the halt command when the write pointer and the read pointer contain the same memory address.

6. A decoder as recited in claim 1, wherein the halt command is provided to the register controller when useful data will be overwritten by a memory write operation.

7. A decoder as recited in claim 6, wherein the useful data is data written to memory by a merge and store module.

8. A method for decoding an incoming compressed bitstream, the method capable of operating on a discontinuous incoming bitstream, the method comprising:
    providing a halt command to a register controller, wherein the register controller is in communication with an input register and an output register, wherein decoding logic receives data input from the input register and provides data output to the output register;
    providing a latch command to the input register and the output register when the register controller receives the halt command; and latching data stored in the input register and the output register when the latch command is received by the input register and the output register.

9. a method as recited in claim 8, wherein the halt command is provided to the register controller when an incoming bitstream is unavailable.

10. a method as recited in claim 9, wherein the halt command is generated by a First-In-First-Out (FIFO) controller.

11. a method as recited in claim 10, wherein the FIFO controller includes a write pointer and a read pointer.

12. a method as recited in claim 11, wherein the FIFO controller generates the halt command when the write pointer and the read pointer contain the same memory address.

13. a method as recited in claim 8, wherein the halt command is provided to the register controller when useful data will be overwritten by a memory write operation.

14. a method as recited in claim 13, wherein the useful data is data written to memory by a merge and store module.

15. An application specific integrated circuit (ASIC) having a decoder for decoding an incoming compressed bitstream, the decoder being capable of operating on a discontinuous bitstream, the ASIC comprising:

a memory controller;

an input register in communication with the memory controller, the input register capable of receiving a latch command, the input register further capable of latching stored data in a particular state upon receiving the latch command;

decoding logic in communication with the input register;

an output register in communication with the decoding logic, the output register capable of receiving the latch command, the output register further capable of latching stored data in a particular state upon receiving the latch command; and a register controller in communication with the input register and the output register, the register controller capable of receiving a halt command, wherein the upon receiving the halt command the register controller sends the latch command to the input register and the output register.

16. An ASIC as recited in claim 15, further comprising a FIFO controller, wherein the FIFO controller generates a halt command when an incoming bitstream is unavailable.

17. An ASIC as recited in claim 16, wherein the FIFO controller includes a write pointer and a read pointer.

18. An ASIC as recited in claim 17, wherein the FIFO controller generates the halt command when the write pointer and the read pointer contain the same memory address.

19. An ASIC as recited in claim 15, further comprising a merge and store module.

20. An ASIC as recited in claim 19, wherein the halt command is generated when useful data written by the merge and store module will be overwritten by a memory write operation.

* * * * *